US008844028B1

(12) United States Patent
Cheng (10) Patent No.: US 8,844,028 B1
(45) Date of Patent: Sep. 23, 2014

(54) ARRANGEMENT AND METHODS FOR PERFORMING MALICIOUS DATA DETECTION AND INFORMATION LEAKAGE PREVENTION

(75) Inventor: Hung-Hao Cheng, Taichung (TW)

(73) Assignee: Trend Micro Inc., Tokyo (JP)

( * ) Notice: Subject to any disclaimer, the term of this patent is extended or adjusted under 35 U.S.C. 154(b) by 1453 days.

(21) Appl. No.: 11/966,870

(22) Filed: Dec. 28, 2007

(51) Int. Cl.
H04L 29/06 (2006.01)

(52) U.S. Cl.
USPC .................. 726/22; 726/24; 726/26; 713/188

(58) Field of Classification Search
CPC ........................... H04L 63/1416; H04L 63/145
USPC ..................................... 726/26, 22
See application file for complete search history.

(56) References Cited

U.S. PATENT DOCUMENTS

| 6,934,857 | B1 * | 8/2005 | Bartleson et al. ................. 726/5 |
| 7,526,516 | B1 * | 4/2009 | Pavlyushchik ........................ 1/1 |
| 2006/0015940 | A1 * | 1/2006 | Zamir et al. .................... 726/22 |
| 2006/0041930 | A1 * | 2/2006 | Hafeman et al. ................. 726/2 |
| 2007/0208751 | A1 * | 9/2007 | Cowan et al. ................... 707/10 |
| 2008/0109871 | A1 * | 5/2008 | Jacobs ............................. 726/1 |

* cited by examiner

Primary Examiner — Mohammad L Rahman
(74) Attorney, Agent, or Firm — IPSG, P.C. Intellectual Property Law (57) ABSTRACT

An integrated secured open database connectivity (ODBC) application programming interface (API) arrangement is provided. The arrangement includes a driver manager, which is configured for at least handling a function call from an application program. The arrangement also includes a set of drivers, which is configured for at least accessing a data source and applying the function call to the data source. The arrangement further includes a security module, which is configured for performing at least one of scanning the function call for malicious content and preventing an unauthorized user from accessing the data source.

19 Claims, 4 Drawing Sheets

ARRANGEMENT AND METHODS FOR PERFORMING MALICIOUS DATA DETECTION AND INFORMATION LEAKAGE PREVENTION

BACKGROUND OF THE INVENTION

On an annual basis, million of dollars are spent on the process of collecting, storing, securing, and retrieving data. With modern computer system, data may be electronically stored in an easily retrievable medium, such as a database, which is a structured collection of data. To manage the database, a database management system (e.g., Oracle®, Microsoft® Access™, Microsoft® SQL Server™, MySQL™, FileMaker® and the like) may be employed to organize, store, and retrieve the data.

Although a database may be manually updated, most database management systems do not provide friendly user interfaces. Instead, independent applications have been developed to enable users to interact with the database management systems. In an example, a company may have a Microsoft® Access™ database storing information about its employees. The human resource department may interact with the database through a human resource management program that has been specifically tailored to enable the human resource representatives to update and retrieve data about employees.

Since each database management system may have a unique structure, an open database connectivity (ODBC) application programming interface (API) may be provided in order to enable an application to interact with any database management system. The ODBC API may include, but are not limited to, a driver manager and a set of drivers. With the ODBC API, each application does not have to be modified in order to interact with a specific database management system. Instead, the ODBC API is configured to accept function calls (e.g., application requests) from applications and translate the function calls into a format that the database can accept and/or understand. Thus, regardless if one company has a Microsoft® Access™ database while another one has an Oracle® database, the same application may be employed since the ODBC API includes a set of drivers that may be configured to handle the interaction between an application and a database.

Unfortunately, the current ODBC API arrangement provides little or no protection against unauthorized users accessing the database. In the example above, an unauthorized user may employ the human resource management program to access data stored on the employee database. For many database management systems, once a user is able to log onto an application that allows a user access to a database, little or no security measure has been implemented to prevent the user from accessing the data. Thus, confidential data leakage may occur. In many instances, no record is kept of the user who is trying to access the data, thereby providing the information technology (IT) department with insufficient data to track the unauthorized user.

In another example, an unauthorized user may employ the human resource management program to insert malicious data into the database. The current ODBC API arrangement may not provide a method for preventing malicious data to be added to the database. In addition, the current ODBC API arrangement provides little or no protection for a user's computer system when the computer system is inadvertently exposed to malicious content stored on a database when data with malicious content is retrieved from the database.

BRIEF SUMMARY OF THE INVENTION

The invention relates, in an embodiment, to an integrated secured open database connectivity (ODBC) application programming interface (API) arrangement. The arrangement includes a driver manager, which is configured for at least handling a function call from an application program. The arrangement also includes a set of drivers, which is configured for at least accessing a data source and applying the function call to the data source. The arrangement further includes a security module, which is configured for performing at least one of scanning the function call for malicious content and preventing an unauthorized user from accessing the data source.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
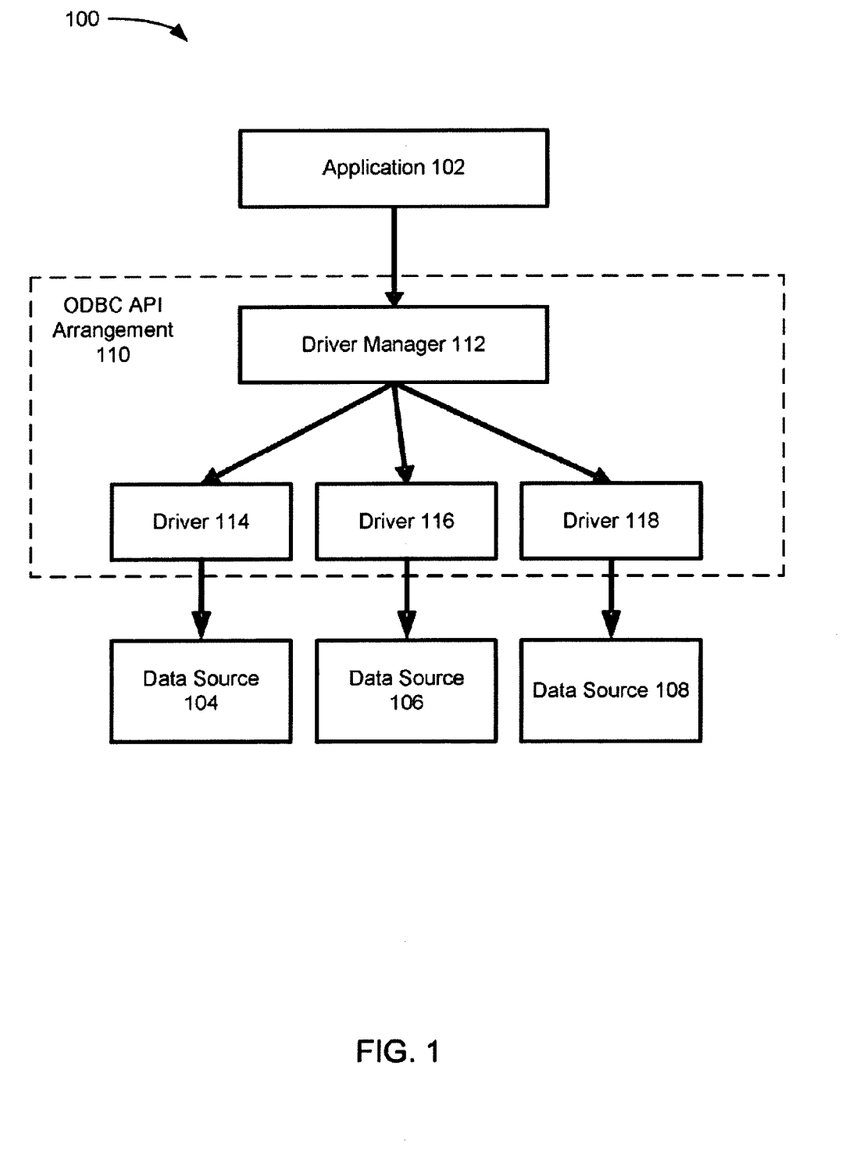
FIG. 1 shows a simple block diagram of an arrangement for enabling an application to interact with a data source.

As aforementioned, the prior art ODBC API arrangement may not provide an integrated solution for protecting a database from malicious attack and/or preventing unauthorized users from accessing data stored within a database. To facilitate discussion, FIG. 1 shows a simple block diagram of an arrangement for enabling an application to interact with a data source. A system 100 may include an application 102, which is an example of a typical front-end application program that a user may employ to interact with a data source (e.g., data source 104, data source 106, and data source 108). An example of an application 102 may be a human resource management application program that may be employed in order to enter data and/or to retrieve data about employees of a company. Consider the situation wherein, for example, a company may have a plurality of databases that may store data about employees of a company. In an example, a company may have a salary database (represented by data source 104), an address database (represented by data source 106), and a job description database (represented by data source 108). The company may employ the human resource management application program to manage the personnel information (e.g., name, salary, addresses, job description, and the like).

Since each data source may be of different format, an ODBC API arrangement 110 is provided to act as a mediator between application 102 and the data sources (104 106, and 108). As discussed herein, a data source refers to a database and the database management system associated with the database. As a mediator, ODBC API arrangement 110 may provide the translation to enable the SQL statement/query sent by application 102 to be understood by the data sources. To perform the task, ODBC API arrangement 110 may include a driver manager 112 and a plurality of drivers (114, 116, and 118).

In the example above, the SQL statement/query may be submitted as a function call. When ODBC API arrangement 110 is employed to submit the function call, driver manager 112 is configured to intercept the function call in order to process the query. One of the functions of processing the query includes determining which driver needs to be loaded in order to handle the query. In an example, a human resource representative needs to update the salary of John Smith from $1000 a month to $1500 a month. The human resource representative may have employed the human resource management application program to update the salary. A typical method for updating a data source includes submitting an SQL (structured query language) statement/query. When application 102 submit the SQL statement/query as an ODBC function call, the SQL statement/query is intercepted by driver manager 112. Upon receiving the SQL statement/query, driver manager 112 may determine that the SQL statement/query is intended to update data source 104. Since driver 114 is associated with data source 104, driver manager 102 may forward the function call to driver 114.

Upon receiving the function call, driver 114 is configured to access data source 104 to access the data related to John Smith. If the SQL statement/query is not in a syntax format that is supported by data source 104, driver 114 is configured to translate and modified the SQL statement/query into a format that is supported by data source 104. Once the data has been updated, driver manager 112 may be configured to unload driver 114.

In another example, if the human resource representative needs to retrieve the address of John Smith, the human resource representative may employ application 102 to query the data source, such as data source 106. Driver manager 112 may be configured to intercept and process the function call with the SQL statement/query. Upon analyzing the SQL statement/query, driver manager 112 may determine that driver 116 may have to be loaded, since driver 116 is associated with data source 106. Upon receiving the function call, driver 116 may retrieve the requested data and send the data back to driver manager 112, which may then forward the data to application 102.

As can be appreciated from the foregoing, ODBC API arrangement 110 enables an application program to interact with data sources, regardless of the data source format. In other words, ODBC API arrangement 110 facilitates interaction between application 102 and the data sources by performing syntax translation. Thus, the data source may be in a proprietary format; however, as long as ODBC API arrangement 110 includes the required drivers, application 102 may send the SQL statements/queries in any format as long as the SQL statements/queries have been properly formed.

Unfortunately, ODBC API arrangement 110 does not provide an integrated security solution for protecting the data sources. Accordingly, a user with evil intent may be able to insert malicious data into a data source once the user is able to access the data source. In an example, a disgruntled human resource representative, who has access to application 102 may purposely insert malicious data into the data sources. The malicious data is damaging in that the malicious data may wreck havoc to the data source and even may cause the hardware to crash. Even if the malicious data may be dormant while being stored within the database, the malicious code may cause damage to a requester's computer system when the requester retrieves the data from the data source.

Although filtering programs may exist enabling some security measures to be implemented, most filtering programs are non-integrated programs that are usually implemented on each computer system. Thus, if a user has not installed a filtering program or if the filtering program is not updated, the user may not be able to prevent malicious code from infiltrating his computer system. In addition, a filtering program is rarely implemented as a preventive measure to protect data sources from malicious code.

In addition, ODBC API arrangement 110 may not provide adequate measures to prevent unauthorized users from accessing confidential data. Similar to the example above, a user that is able to access a data source is usually able to view the data within a data source. In an example, a user may view and/or write to all data within a data source as long as the user is able to access the data source. Thus, confidential data, such as the salary package for the president of a company, may be viewed by all who is able to access the data source.

Furthermore, the prior art arrangement may not provide a tracking system for identifying users who may be trying to attack the data source or who may be trying to access confidential data. In an example, if a human resource department has fifty representatives, the prior art ODBC API arrangement may not provide a method for identifying the culprit. Thus, information technology (IT) personnel and/or managers may not be aware of the transgression and may be unable to address the issue to prevent a future occurrence. In addition, when the data source is compromised, the task of identifying the perpetrator among the fifty representatives becomes a difficult task since the prior art ODBC API arrangement lacks a tracking system.

Since the prior art ODBC API arrangement provides data sources with little or no protection against malicious attack and/or unauthorized viewing, the inventor herein realized, in one aspect of the invention, that a security feature implemented as part of the ODBC API arrangement is needed in order to provide an integrated secured solution for protecting the data sources. In accordance with embodiments of the present invention, a security module is provided for creating an integrated secured ODBC API arrangement. Embodiments of the invention include a secured driver manager for intercepting requests and/or responses between an application program and a data source. Also, embodiments of the invention include methods for preventing attacks from malicious content. Further, embodiments of the invention include methods for preventing data leakage, especially confidential data leakage.

In an embodiment of the invention, an integrated secured ODBC API arrangement is provided. Besides the driver manager and the set of drivers that have previously existed in the prior art, the integrated secured ODBC API arrangement is configured to also include a security module, in an embodiment. Unlike the prior art, the security module is an integrated security solution embedded between an application program and the driver manager. The security module is configured to perform at least one of preventing malicious content from populating a data source, preventing malicious data content from damaging a user's computer system, and preventing unauthorized user from accessing confidential data.

In an embodiment, the security module may include a secured driver manager. The secured driver manage may be configured to intercept all ODBC API function calls. The ODBC API function calls may be requests for access to a database (e.g., SQL statement/query) from an application program, for example. Also, the ODBC API function calls may be responses to data retrieval requests from an application program.

The security module may also be configured to include a scanning engine. In an embodiment, the secured driver manager may activate a scanning engine, such as Trend Micro VSAPI (virus scan application program interface) scanning engine, to detect malicious content (e.g., data, code, etc.). In the prior art, the function call is usually handled without the benefit of scanning. Hence, malicious code may go undetected resulting in damages to the data source and/or the computer system storing the data source.

Unlike the prior art, the function call is scanned for malicious content before being processed by the driver manager. If malicious content is identified, the secured driver manager may be configured to discard the function call. In an embodiment, the secured driver manager may also perform operation roll-back to remove the malicious content if the malicious content has already populated the data source. In yet another embodiment, the secured driver manager may also terminate the application program that has sent the function call.

In the prior art, little or no security measure is implemented to prevent unauthorized users from accessing sensitive data. In an embodiment, the security module may also be configured to include a security policy component. The security policy component may be configured to include a set of rules for accessing a data source. The set of rules may be based on a plurality of factors, including but are not limited to, the access point and a user account. In an example, a user may have access to different type of data depending upon a user's security level designation. For example, a business analyst may have a lower security level designation than a director of a department. In another example, a user's access to the data sources may be limited based on the access point. In an example, a user who is usually allow to perform update to a data source may be limited to viewing data only when the user is accessing the data source from a non-secured terminal.

In addition to a security policy component, the security module may also include a content filtering component, which may be configured to prevent data leakage (e.g., confidential data leakage). Data prevention leakage may occur through a plurality of known techniques, including but are not limited to, SQL injection detection, keyword matching, and the like. In an example, the content filtering component may be configured to include a set of words that may restrict access to specific content. In other words, if one or more of the set of words is in the function call, the data content is not accessible unless the user is part of the restricted group.

As can be appreciated from the foregoing, the security module may be implemented without requiring modification to the application program, the driver manager, and/or the set of drivers. The ability to provide the integrated security solution with little or no modification provides a great advantage to the implementation of the security module since most companies do not have access to the source code of the appliances/programs, thereby making modification difficult, if not near impossible. In addition, since the security module is being integrated into the ODBC API arrangement, the scanning engine may provide protection for the data source even if the server housing the data source has not implemented an up-to-date anti-virus program. Also, each individual computer system is similarly protected, thereby removing the burden of maintaining an up-to-date anti-virus program in order to prevent malicious content, which has been retrieved from a data source, from infecting a user's computer system.

The features and advantages of the present invention may be better understood with reference to the figures and discussions that follow.

Figure 2:
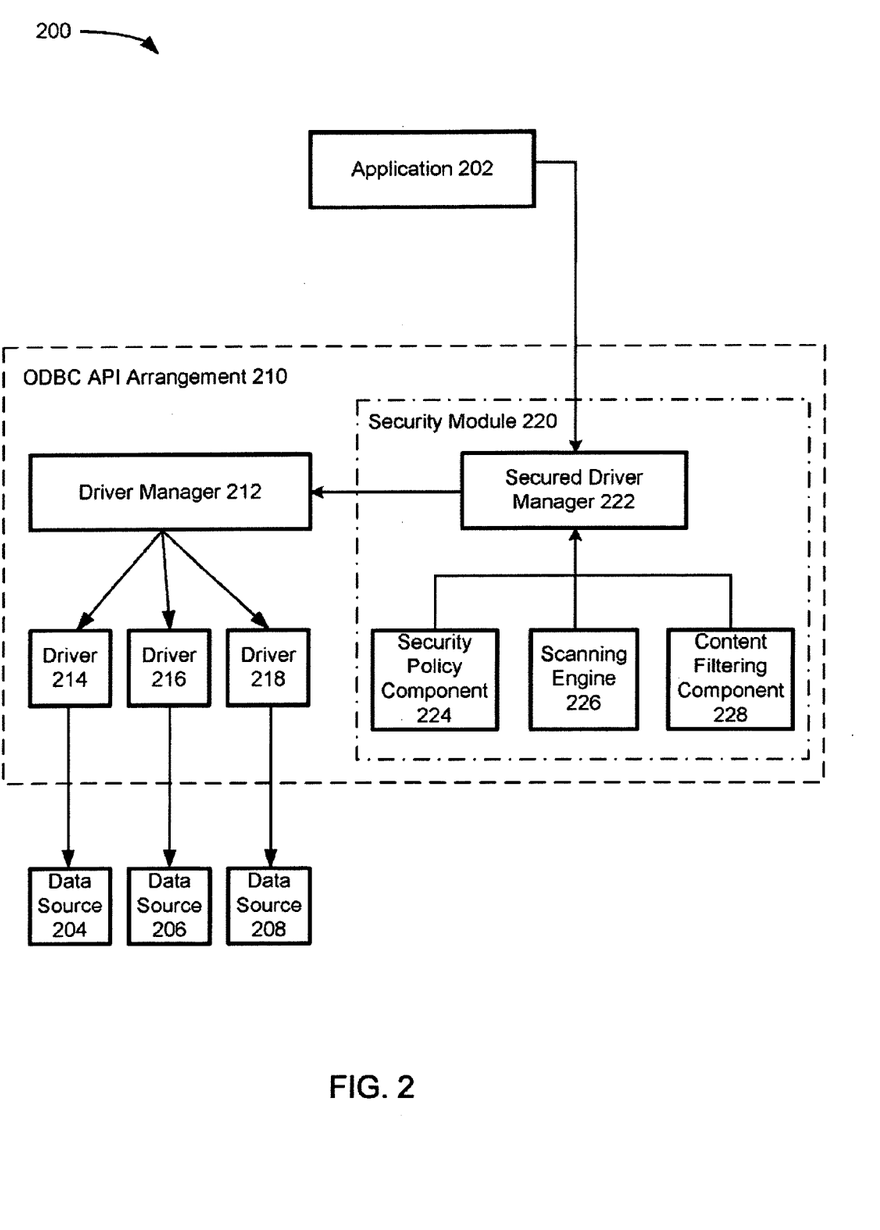
FIG. 2 shows, in an embodiment of the invention, a simple block diagram of an integrated secured arrangement for enabling an application to interact with a data source, such as a database.

FIG. 2 shows, in an embodiment of the invention, a simple block diagram of an integrated secured arrangement for enabling an application to interact with a data source, such as a database. A system 200 may include an application 202, which is an example of a front-end application program that is configured to interact with a data source (e.g., data source 204, data source 206, and data source 208). To facilitate interaction between application 202 and the data sources (e.g., data source 204, data source 206, and data source 208), an integrated secured ODBC API arrangement 210 may be provided. Integrated secured ODBC API arrangement 210 may include a driver manager 212, a set of drivers (214, 216, 218), and a security module 220.

Driver manager 212 is similar to the prior art driver manager in that driver manager 212 is configured to process the SQL statements/queries received from application 202. Also, driver manager 212 is configured to determine which driver to load in order to enable the successful handling of the SQL statements/queries. Further, driver manager 212 is configured to unload the driver when the driver has completed its task.

The set of drivers (214-218) is also similar to the prior art in that the set of drivers (214-218) is configured to perform translation. As aforementioned, the format of a data source may vary. However, instead of manipulating the application program in order to enable the application program to interact with the data source, a driver is available for performing the translation. Usually, each driver is dedicated to a specific database management system and is configured to perform translation between the application and the specific data source.

Unlike the prior art, integrated secured ODBC API arrangement 210 includes a security module 220, which is configured to provide the ODBC API arrangement with an integrated security solution. In an embodiment, security module 220 is configured to be implemented as a program between application 202 and driver manager 212. Security module 220 may include a secured driver manager 222, a security policy component 224, a scanning engine 226, and a content filtering component 228.

In an embodiment, secured driver manager 222 is configured to intercept the SQL statements/queries sent by application 202. In other words, the SQL statements/queries are analyzed by secured driver manager 222 before forwarding the SQL statements/queries to driver manager 212. In an embodiment, if malicious content is identified or if the user is determined to be an unauthorized user, the SQL statements/queries may be discarded. In an embodiment, secured driver manager 222 may also be configured to terminate application 202 in order to prevent the user from sending further SQL statements/queries.

In yet another embodiment, secured driver manager 222 is configured to intercept data being sent from one of the data sources via driver manager 212 to application 202. In an example, salary information about John Smith may be sent in response to a request from application 202. However, before application 202 can receive the salary data from driver manager 212, secured driver manager 222 is configured to intercept the data content.

Once secured driver manager 222 has intercepted the SQL statements/queries, for example, the SQL statements/queries may be scanned for malicious content. In an embodiment, secured driver manager 222 may activate scanning engine 226. As can be appreciated from the foregoing, the number of scanning engines implemented may vary depending upon a company's preference. By placing scanning engine 226 within the ODBC API arrangement, malicious content may be identified before the malicious content can cause harm to the data source. As can be appreciated from the foregoing, if data content from a data source is intercepted while it is being routed to application 202, scanning engine 226 is configured to scan the data content to determine if malicious content exists. With scanning engine 226 being centralized as part of the integrated secured ODBC API arrangement, users may benefit from the scanning features without incurring the cost of implementing and maintaining the scanning engine.

In an embodiment, secured driver manager 222 is also configured to include security policy component 224, which may be configured to include a set of rules for determining user access. In an example, an access rule may include data content accessibility based on security level designation. In another example, an access rule may include security level designation based on access point. In other words, the type of data content that may be accessed at a public computer, such as a library computer, may be limited to low security level designation whereas the computer system of the president of the company may have a high security level designation and may be able to access sensitive data.

In yet another embodiment, access to data may be determined based on content request. In an example, a new human resource representative may try to access confidential data about executives of the company. Secured driver manager 222 may activate content filtering component 228 to determine if the data content being requested is restricted. In an embodiment, content filtering component 228 may be configured to include a set of words that may be considered as confidential. In addition, the set of words may be divided into different confidential levels depending upon the sensitivity of the data. In an example, data about senior-level executives may be considered as more sensitive than junior-level executives. Thus, the access restriction to the data about senior-level executives may be restricted and not available for viewing by the new human resource representative.

In an embodiment, content filtering component 228 may apply an exact word match to determine if the SQL statements/queries include any of the words that may restrict access. In another embodiment, matching may be performed by content filtering component 228 through regular expressions. As can be appreciated from the foregoing, different matching techniques may be implemented to perform the matching and is not limited by the examples provided above.

As can be appreciated from FIG. 2, security module 220 may be implemented without modification to the prior art arrangement. In other words, the implementation of security module 220 does not require application 202, driver manager 212, and the drivers (214, 216, and 218) to be modified. Thus, security module 220 may be easily integrated into the ODBC API arrangement to provide a centralized security solution without having to individually modify each application program and/or drivers.

Figure 3:
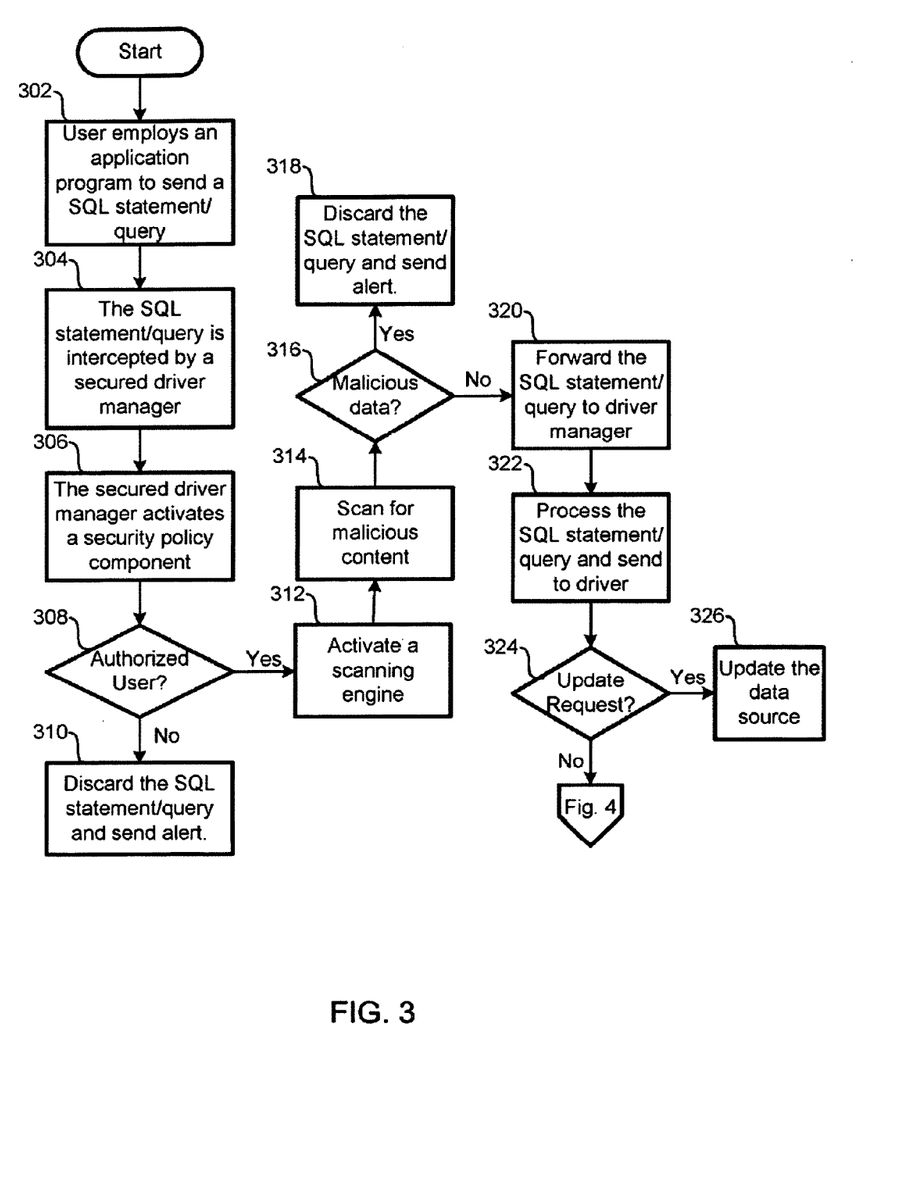
FIG. 3 shows, in an embodiment of the invention, a simple flow chart illustrating an example of how a security module may be employed to prevent malicious content from populating a data source.

To illustrate how integrated secured ODBC API arrangement 210 may be implemented, two flow charts (FIG. 3 and FIG. 4) may be discussed in relation to FIG. 2. To facilitate discussion, FIG. 3 shows, in an embodiment of the invention, a simple flow chart illustrating an example of how a security module may be employed to prevent malicious content from populating a data source.

At a first step 302, a user may employ an application program to send a SQL statement/query as a function call in order to update an employee record. Consider the situation wherein, for example, a human resource representative wants to update the personnel data of Thomas Brown. The employee records are stored in a plurality of data sources, including a salary database (data source 204), an address database (data source 206), a job description database (data source 208), and the like. To update the salary from $1200 to $1500, for example, the human resource representative may employ application 202, which may be a human resource management program.

At a next step 304, the SQL statement/query may be intercepted by a secured driver manager. In an embodiment, secured driver manager 222 is positioned between application 202 and driver manager 212 and is configured to intercept ODBC function calls (i.e., SQL statements/queries).

At a next step 306, the secured driver manager may activate a security policy component to determine if the requester has sufficient access authorization. In an embodiment, the secured driver manager may apply the rules as defined in the security policy module. In an example, security policy component 224 may include rules defining what type of security level designation is required to be granted the right to update the salary database (data source 204).

At a next step 308, the secured driver manager may make a determination on whether or not the user has the proper authorization to access the data.

If the user is not authorized to access the data, the SQL statement/query may be discarded, at a next step 310. In an embodiment, an alert may be sent to an authority, such as an administrator or the user's manager. The alert enables the authority to handle the unauthorized access to confidential data.

However, if the user is authorized to access the data, a scanning engine may be activated to scan the SQL statement/query for potential malicious code, at a next step 312. In this example, the human resource representative may have the required security level designation to perform updates.

At a next step 314, the SQL statement/query is analyzed to determine the existence of malicious content. In an example, secured driver manager 222 may activate scanning engine 226 to scan the SQL statement/query to determine if the SQL statement/query includes malicious data and/or code. Accordingly, scanning engine 226 may include one or more anti-virus programs.

At a next step 316, security module 220 may make a determination on the existence of malicious content within the SQL statement/query.

If malicious data has been identified, then at a next step 318, the SQL statement/query may be discarded. In an embodiment, an alert message may be sent to the administrator to inform the administrator of the attempt to upload malicious code to the data source.

However, if the SQL statement/query is free of malicious content, then at a next step 320, the secured driver manager may forward the function call with the SQL statement/query to the driver manager. In an example, since the request to update the salary of Thomas Brown is free of malicious content, secured driver manager 222 may forward the SQL statement/query to driver manager 212 for processing.

At a next step 322, upon receiving the function call, the driver manager may process the request by determining which driver is needed in order to handle the request. In an example, driver manager 212 may determine that the SQL statement/query is intended to update the salary information for Thomas Brown in data source 204.

At a next step 324, the driver may handle the request within the SQL statement/query. In an example, driver 214 may make a determination on whether an update request or a retrieval request has been sent.

If an update request has been sent, at a next step 326, the driver may update the data. In an example, driver 214 may access and update the salary data for Thomas Brown.

Figure 4:
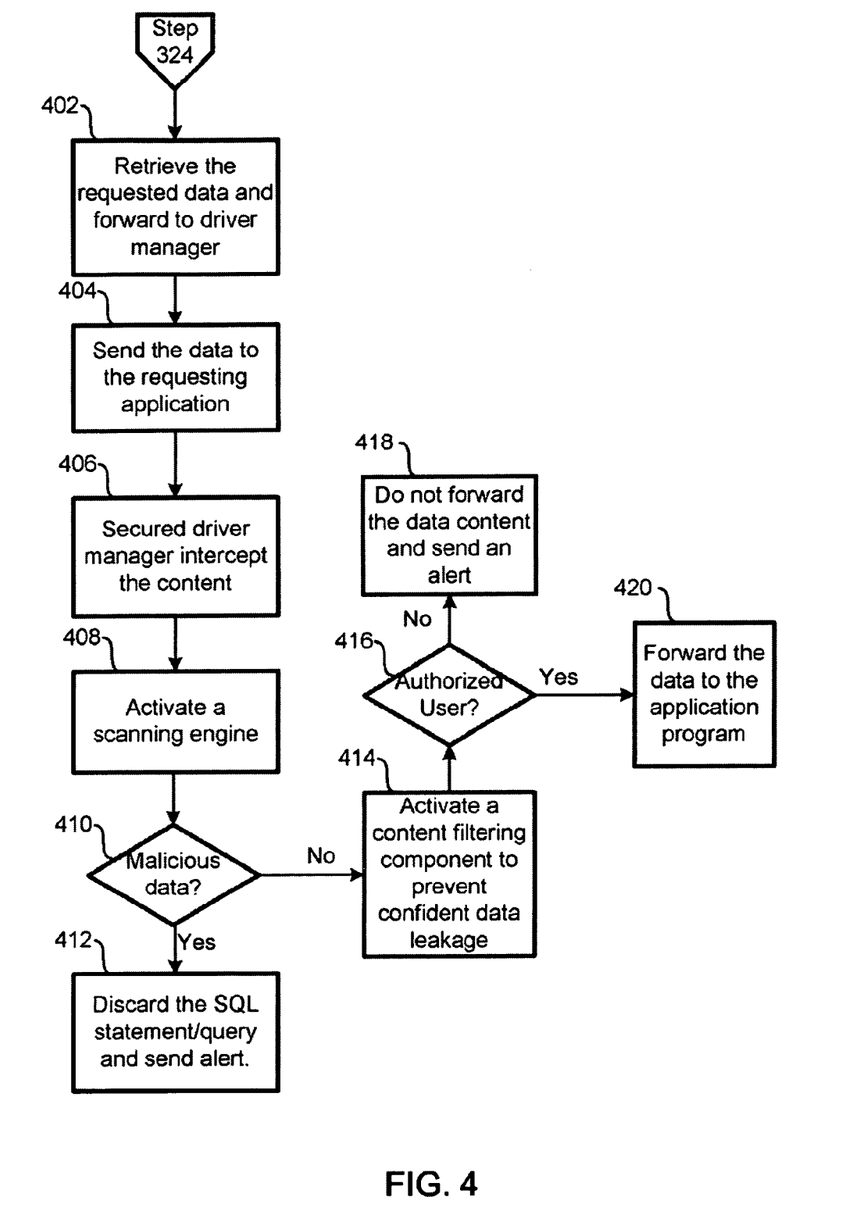
FIG. 4 shows, in an embodiment of the invention, a simple flow chart illustrating an implementation of the integrated secured ODBC API arrangement to prevent confidential information leakage.

However, if a retrieval request has been sent, then refer to FIG. 4.

In an embodiment, security module 220 may also provide protection for a user when data from a data source is retrieved. FIG. 4 shows, in an embodiment of the invention, a simple flow chart illustrating an implementation of the integrated secured ODBC API arrangement to prevent confidential information leakage.

Consider the situation wherein, for example, a user wants to retrieve salary data of Peter Graham, a senior vice-president of the company. The steps for sending the request for data may be similar to steps 302-324 described in FIG. 3.

As aforementioned, if the SQL statement/query is a retrieval request at step 324, then at a next step 402, the data requested may be retrieved by the driver and forwarded to the driver manager.

Upon receiving the data content, at a next step 404, the driver manager may send the content to the requesting application.

However, before the requesting application may receive the requested data, the secured driver manager may intercept the data content, at a next step 406.

Since the security module has already determined a user's authorization, the secured driver manager may not re-assess the user's authorization access. Instead, the secured driver manager may activate the scanning engine, at a next step 408, to scan the data content for potential malicious code. In an example, secured driver manager 222 may activate scanning engine 226 to scan the data content to determine if the requested data includes malicious data and/or code.

At a next step 410, the secured driver manager makes a determination on the existence of malicious code.

If malicious code is identified, at a next step 412, the data content may be discarded. In an embodiment, since the malicious content is already stored on the database, the malicious content may be automatically removed from the database. Alternatively, an alert message may be sent to the administrator to inform the administrator of the malicious code, thereby enabling the administrator to perform further analysis on the malicious code.

However, if the SQL statement/query is free or malicious content, then at a next step 414, the secured driver manager may activate a content filtering component to prevent data leakage (e.g., confidential data leakage). As aforementioned, techniques for determining data leakage are common in the art and may include SQL injection detection and keyword matching. In an example, content filtering component 228 may perform keyword matching by employing at least one of exact matching and/or regular expressions. In an embodiment, content filtering component 228 may include a set of words from which keyword matching may be performed. For example, if data content includes one or more of these words, the content filtering component may prevent access to the data content if the user is not a member of the restricted group of users.

At a next step 416, the secured driver manager may determine if the user is allowed access to the data content.

If the user is not authorized to access the data, the data content may not be forwarded to the requesting application, at a next step 418. In an example, the user may be trying to access confidential information that only a limited number of people may be granted access. In an embodiment, an alert may be sent to an authority, such as an administrator or the user's manager. The alert enables the authority to handle the unauthorized access to confidential data.

However, if the user is authorized to access the data or if the data content does not include restricted content, then at a next step 420, the secured driver manager may forward the data to the requesting application.

As can be appreciated from the forgoing, one or more embodiments of the present invention provide a security module for effectively transforming the prior art ODBC API arrangement into an integrated secured solution for enabling interaction between an application and a data source. With the security module, a company does not have to discard the appliances/programs (e.g., application programs, driver manages, and drivers) that the company may have already spent considerable investment on. Instead, the security module may be added with little or no modification to the company's current computer system infrastructure. Thus, the security module provides protection to a company's data sources with minimal cost to the company.

While this invention has been described in terms or several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An integrated secured open database connectivity (ODBC) application programming interface (API) arrangement, comprising:
a driver manager, said driver manager being configured for at least handling a function call from an application program;
a set of drivers, said set of drivers being configured for at least accessing a data source and applying said function call to said data source;
a security module, said security module being configured for performing at least one of scanning said function call for malicious content and preventing an unauthorized user from accessing said data source; and
a secured driver manager, said secured driver manager being in communication with at least said security module and disposed in a data path between said application program and said driver manager to at least intercept said function call to decide whether said function call would be forwarded to said driver manager, wherein said driver manager, a driver of said set of drivers, and said security module is implemented as computer readable code in a non-transitory computer readable medium.

2. The arrangement of claim 1 wherein said security, module includes a set of scanning engines, said set of scanning engines being configured to scan said function call for said malicious content, wherein said secured driver manager does not pass said function call to said driver manager if said malicious content is detected.

3. The arrangement of claim 2 wherein said secured driver manager is configured to discard said function call if said function call includes said malicious content.

4. The arrangement of claim 3 wherein said secured driver manager is configured to terminate said application program if said function call includes said malicious content.

5. The arrangement of claim 4 wherein said security module includes a security policy component, said security policy component being configured to include at least a set of rules for determining a user's access authorization, wherein said secured driver manager does not pass said function call to said driver manger if said user's access authorization is not authorized.

6. The arrangement of claim 5 wherein said security module includes a content filtering component, said content filtering component being configured for at least performing confidential data leakage prevention, said performing confidential data leakage prevention including at least performing keyword matching for determining said user's access authorization.

7. The arrangement of claim 1 wherein said secured driver manager being configured to intercept requested data of said data source received from said driver manager before said requested data is received by said application program, wherein said secured driver manner does not pass said requested data to said application program if one of a security and malware criteria is not satisfied.

8. The arrangement of claim 7 wherein said security module is configured to include a set of scanning engines, said set of scanning engines being configured to detect malicious content within data content of said requested data, wherein
if said malicious content within said data content is detected, performing at least one of
discarding said requesting data,
performing an operation roll-back to remove said requested data from said data source if said requested data includes said malicious content, and
sending an alert message to an administrator informing said administrator about said malicious content within said data content, and
if said data content is free of said malicious content, forwarding said requested data to said application program only if said user has access authorization to said requested data.

9. The arrangement of claim 8 wherein said security module is configured to include a content filtering component, said content filtering component being configured for at least performing confidential data leakage prevention, said performing confidential data leakage prevention including at least performing keyword matching on said data content to determine said access authorization of said user, wherein
said forwarding of said requested data to said application program is performed if said user has said access authorization, and
if said user is not authorized to receive said requested data, performing at least one of
discarding said requesting data, and
sending an alert message to said administrator informing said administrator about an attempt by said user to access said data content.

10. A method for securing a data source utilizing an integrated secured open database connectivity (ODBC) application programming interface (API) arrangement, comprising:
intercepting a function call from an application program by said ODBC API arrangement for accessing data within said data source;
determining access authorization of a user to said data source, said access authorization of said user is being defined by a set of rules of a security module of said ODBC API arrangement;
if said user is not authorized, performing, without forwarding said function call to an ODBC API driver manager for accessing said data within said data source, wherein said intercepting is performed using a secured driver manager of said security module that is interposed in a data path between said application program and said ODBC API driver manager that is employed for interacting with said data source, at least one of
discarding said function call,
terminating said application program, and
sending an alert message to an administrator informing said administrator about an attempt by said user to access said data of said data source; and
if said user is authorized, scanning by a set of scanning engines said function call for malicious content, wherein
if said function call is not infected as determined by said scanning, accessing said data source and applying said function call to said data source, and
if said function call is infected as determined by said scanning, performing, without forwarding said function call to a driver manager for accessing said data within said data source, at least one of
discarding said function call,
terminating said application program, and
sending an alert message to said administrator informing said administrator about said malicious content, wherein, at least one of said intercepting and determining access authorization is implemented as computer readable code in a non-transitory computer readable medium.

11. The method of claim 10 further including intercepting requested data from said data source before said requested data is received by said application program.

12. The method of claim 11 further including scanning said requested data for malicious content within data content of said requested data, wherein
if said malicious content within said data content is detected, performing, without forwarding said requested data to said application program, at least one of
discarding said requested data,
performing an operation roll-back to remove said requested data from said data source if said requested data includes said malicious content, and
sending an alert message to said administrator informing said administrator about said malicious content within said data content, and
if said data content is free of said malicious content, forwarding said requested data to said application program if said user has said access authorization.

13. The method of claim 12 further including performing confidential data leakage prevention, said performing confidential data leakage prevention including at least performing keyword matching on said data content to determine said access authorization of said user, wherein
said forwarding of said requested data to said application program is performed if said user is authorized to received said requested data, and
if said user is not authorized to receive said requested data, performing at least one of
discarding said requesting data, and
sending an alert message to said administrator informing said administrator about an attempt by said user to access said data content.

14. A method for implementing an integrated secured open database connectivity (ODBC) application programming interface (API) arrangement, comprising:
providing a secured driver manager said secured driver manager being configured for intercepting a function call from an application program for accessing data within a data source, wherein said secured driver manager is interposed in a data path between said application program and an ODBC driver manager employed for interacting with said data source;
applying a set of rules for determining access authorization of a user to said data source, said set of rules being stored in as security policy component;
activating a set a scanning engines if said user has said access authorization, said set of scanning engines being configured for scanning said function call for malicious content;
if said function call is not infected as determined by said scanning, loading a driver of a set of ODBC drivers to apply said function call to said data source; and
if said function call is infected as determined by said scanning after said intercepting, discarding said function call without forwarding said function call to said manager, wherein said applying and activating is implemented as computer readable code in a non-transitory computer readable medium.

15. The method of claim 14 further including
if said user is not authorized, performing at least one of
discarding said function call,
terminating said application program, and
sending an alert message to an administrator informing said administrator about an attempt by said user to access said data within said data source.

16. The method of claim 14 further including if said function call is infected as determined by said scanning, performing at least one of
terminating said application program, and
sending an alert message to an administrator informing said administrator about said malicious content.

17. The method or claim 14 further including intercepting requested data, using said secured driver manager, from said data source before said requested data is received by said application program.

18. The method of claim 17 further including scanning said requested data for malicious content within data content of said requested data, wherein
if said malicious content within said data content is detected, performing at least one of
discarding said requested data,
performing an operation roll-back to remove said requested data from said data source if said requested data includes said malicious content, and
sending an alert message to an administrator informing, said administrator about said malicious content, and
if said data content is free of said malicious content, forwarding said requested data to said application program if said user has said access authorization.

19. The method of claim 18 further including performing confidential data leakage prevention, said performing confidential data leakage prevention including at least performing keyword matching on said data content to determine said access authorization of said user, wherein
said forwarding of said requested data to said application program is performed if said user is authorized to received said requested data, and
if said user is not authorized to receive said requested data, performing at least one of
discarding said requesting data, and
sending an alert message to said administrator informing said administrator about an attempt by said user to access said data content.

* * * * *